(12) United States Patent
Aden et al.

(10) Patent No.: US 10,352,781 B2
(45) Date of Patent: Jul. 16, 2019

(54) MICRO HEATER INTEGRATED WITH THERMAL SENSING ASSEMBLY

(71) Applicant: Applied Nanostructures, Inc., Mountain View, CA (US)

(72) Inventors: Gary D. Aden, Redwood City, CA (US); Josiah F. Willard, Santa Clara, CA (US)

(73) Assignee: APPLIED NANOSTRUCTURES, INC., Mountain View, CA (US)

( * ) Notice: Subject to any disclaimer, the term of this patent is extended or adjusted under 35 U.S.C. 154(b) by 61 days.

(21) Appl. No.: 14/600,967

(22) Filed: Jan. 20, 2015

(65) Prior Publication Data

US 2015/0204734 A1    Jul. 23, 2015

Related U.S. Application Data

(60) Provisional application No. 61/930,393, filed on Jan. 22, 2014.

(51) Int. Cl.
| | | |
|---|---|---|
| *G01K 15/00* | (2006.01) | |
| *G01K 7/02* | (2006.01) | |
| *G01K 7/22* | (2006.01) | |
| *G01K 17/00* | (2006.01) | |

(52) U.S. Cl.
CPC ............ *G01K 15/005* (2013.01); *G01K 7/02* (2013.01); *G01K 7/22* (2013.01); *G01K 17/006* (2013.01)

(58) Field of Classification Search
CPC .......... G01K 15/005; G01K 7/02; G01K 7/22; G01K 7/006
USPC ............................................................ 374/1
See application file for complete search history.

(56) References Cited

U.S. PATENT DOCUMENTS

| | | | | |
|---|---|---|---|---|
| 6,331,074 B1* | 12/2001 | Kimura | ............... | G01N 5/04 |
| | | | | 219/209 |
| 6,988,399 B1* | 1/2006 | Watanabe | ............. | F02D 41/187 |
| | | | | 73/204.26 |
| 8,719,960 B2* | 5/2014 | King | .................... | G01K 1/143 |
| | | | | 850/12 |
| 2002/0142478 A1* | 10/2002 | Wado | .................. | G01N 27/124 |
| | | | | 436/151 |
| 2007/0212263 A1* | 9/2007 | Shin | ..................... | G01N 27/16 |
| | | | | 422/95 |
| 2008/0317087 A1* | 12/2008 | Kimura | .................. | G01J 5/16 |
| | | | | 374/1 |
| 2009/0158859 A1* | 6/2009 | Huang | ................. | G01F 1/6845 |
| | | | | 73/861.351 |
| 2013/0209315 A1* | 8/2013 | Kimura | ............. | G01N 25/4873 |
| | | | | 422/88 |
| 2013/0308378 A1* | 11/2013 | Manaka | .................. | G01K 7/16 |
| | | | | 365/163 |

(Continued)

FOREIGN PATENT DOCUMENTS

JP    2013239401 A    * 11/2013

OTHER PUBLICATIONS

Translation of JP 2013239401 A.*

*Primary Examiner* — Nathaniel T Woodward
(74) *Attorney, Agent, or Firm* — Mark Rodgers

(57) ABSTRACT

A calibration device including a thermal sensing device, and a reference heater, where the heater and the sensing device are integrated together, the heater and the sensing have at least one dimension substantially in common, and the over all dimensions are in the range of thermal micro probes, 100 nm-500 microns.

8 Claims, 2 Drawing Sheets

(56) References Cited

U.S. PATENT DOCUMENTS

2014/0036953 A1\* 2/2014 Kimura ................... G01J 5/16
 374/121
2016/0216163 A1\* 7/2016 Lin ................... G01N 25/4893

\* cited by examiner

1. Heater
2. Heater Contact
3. Heater Metal
4. Insulating Layer
5. Thermal Sensing Element
6. Thermal Sensing Element Contact Metal – 1
7. Thermal Sensing Element Contact Metal – I – 2

1. ▭▭▭▭ Heater
2. ▓▓▓▓ Heater Contact
3. ▦▦▦▦ Heater Metal

MICRO HEATER INTEGRATED WITH THERMAL SENSING ASSEMBLY

BACKGROUND

The specification relates to the field of microscopy and microanalysis to study the effect of heating on the sample properties, and in particular a device intended to provide heat in a very small area with a known temperature Miniature thermal sensing devices such as thermocouples or thermistors are increasingly applied to measure thermal properties on very fine scales. One such device may be a thermal probe for scanning thermal microscopy (SThM) with integrated nanoscale thermal measuring devices. Improvements in the calibration of such devices may be desirable for scanning thermal microscopy and other fine scale thermal measurement techniques

BRIEF DESCRIPTION

In some embodiments, an independent and integrated temperature measuring capability may be provided using sensing element such as a metal thermocouple or thermistor placed directly above and in contact with the micro heater source, with the integrated assembly sized compatible with thermal microprobes, such as SThM probes.

In some embodiments the device is made from a single crystal silicon wafer.

In some embodiments the thermal sensing device may include at least one of a thermocouple or thermistor.

In some embodiments the heater may be defined using an ion implantation process.

In some embodiments the ion implantation may be a low dose phosphorus ion implantation, and the dose and energy of the ion beam determines the resistance of the heater.

In some embodiments the heater may defined using at least one of thin film resistors of metals or metal compounds.

In some embodiments the heater contacts may be defined with at least one of higher dose of phosphorous ion implantation or metal films.

In some embodiments the heater contacts may be further connected with metal films to supply power to the heater.

In some embodiments a sensing element, including at least one of a thermocouple made of two different metals or alloys or a thermistor, may be integrated with the heater, with an active area of the sensing element positioned directly above the heater, with an insulating layer used to isolate the sensing element connections thermally and electrically, with the insulating layer at least one of deposited or grown on the heater.

DETAILED DESCRIPTION OF ILLUSTRATIVE EMBODIMENTS

One or more embodiments described herein may provide provide heat in a very small area with a known temperature, typically using an integrated thermal sensor and heater with sensor dimensions similar to the heater providing an accurate measurement of the temperature.

One or more embodiments described herein may provide a controlled local heating with direct temperature measurement of interest to calibrate miniature thermal sensing devices such as thermocouples or thermistors.

One or more embodiments may provide for calibration such devices when the device is a thermal probe for scanning thermal microscopy.

The following disclosed methods and devices are may be fabricated, in some embodiments, using microfabrication techniques applied to MicroElectricalMechanical Systems (MEMS) techniques.

Micro scale thermal probes are used for application where thermal measurements on a scale of a few microns or even nanometers is desirable. One such example SThM. In SThM, a thermal probe is integrated with a thermal sensing device such as thermocouple or thermistor. The probe may be scanned across a sample and the temperature measured over very small local dimensions. Another example is to heat a sample locally to study thermal properties such as glass transition temperature. These microscopic analyses are carried out either in air using scanning probe microscopes or in vacuum by scanning electron and scanning tunneling microscopes. In order to measure real temperature of a sample at the nanoscale, the thermal sensing element should be calibrated. In one embodiment a calibration device performs a calibration using a reference heater integrated with a thermal sensing element. The heater dimensions and thermocouple dimensions are preferably in the size range of thermal probes, typically on the order of microns combination. Most SThM probes have Length-Width-Thickness dimensions on the order of hundreds of nanometers to hundreds of microns.

Figure 1:
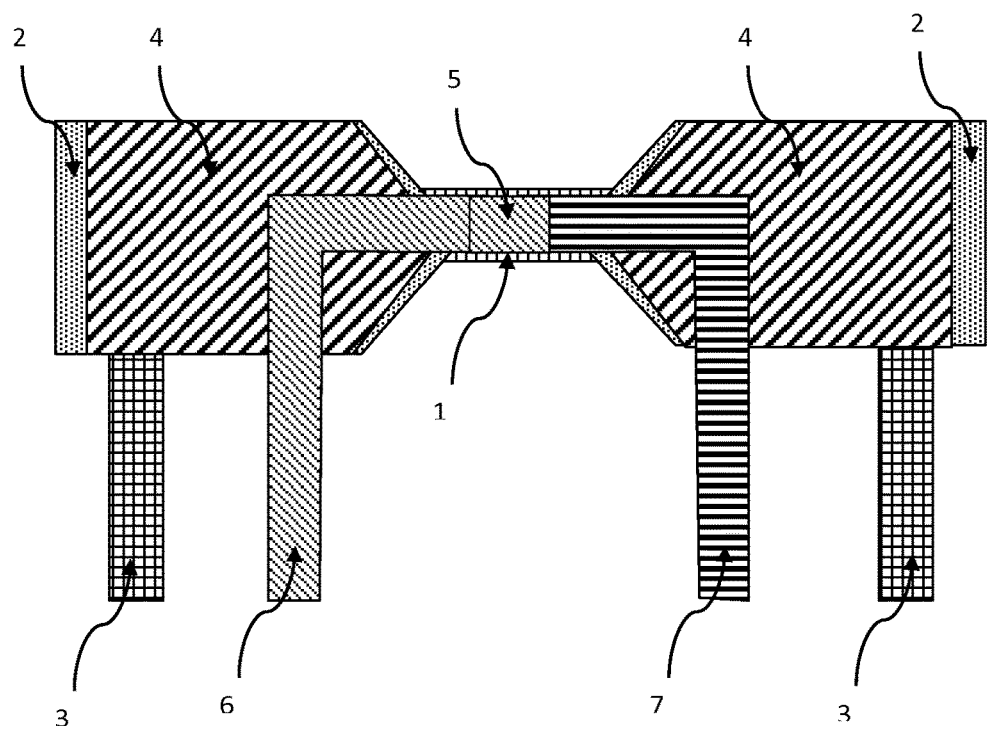
FIG. 1 depicts illustrative embodiment.

A device containing a heater 1 integrated with thermal sensing element 5 as shown in FIG. 1. In an embodiment, the device is made in a single crystal silicon wafer. The heater 1 is defined using an ion implantation process. It is a low dose phosphorus ion implantation. The dose and energy of the ion beam determines the resistance of the heater. Alternatively, the heater can be defined using thin film resistors of metals or metal compounds. The heater contacts 2 are defined with higher dose of phosphorous ion implantation. Alternatively, the contact can be made with metal films. The heavy dose ion implanted regions 2 or the metal connections 3 are further connected with metal films to supply power to the heater.

Thermal sensing elements are the devices that change properties with temperature. The examples of these devices are thermistors, thermocouples etc. In this invention, a thermocouple made of two different metals or alloys is integrated with the heater. The thermocouple junction 5 is positioned directly above the heater 1. An insulating layer 4 is used to isolate the thermocouple metal lines 6 and 7 thermally and electrically. This insulating layer can be either deposited or grown on the heater.

Alternatively, a thermistor or other thermal sensing element can be used as thermal sensing element 5 with metal lines 6 and 7 as connecting line.

Figure 2:
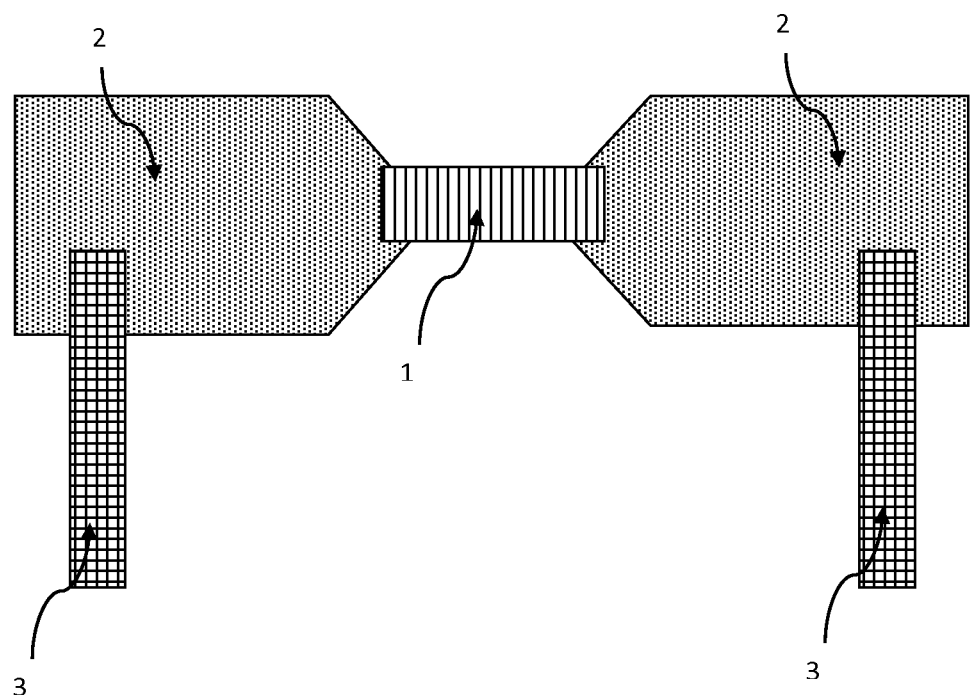
FIG. 2 depicts the heater portion of an illustrative embodiment.

The heater dimensions are defined with lithographic process and therefore can be as small as 100 nm. This allows the device to heat samples at the nanometer scale. A heater without thermal sensing element is shown in FIG. 2.

This design has an independent and integrated temperature measuring capability using a metal thermocouple or thermistor placed directly above and in contact with the micro heater source in some embodiments. A thermocouple or thermistor can give a direct and accurate measurement of the temperature directly above the heater. Also since it is made of metal it will have very little temperature differential between the top of the metal surface which is used for calibration and the bottom of the metal surface which is in contact with the heater. Any sample or tip placed in contact with the Thermocouple will be close to the measured temperature. Previous designs of microheaters have used the change in resistance of the heater to estimate the temperature. Measuring the resistance change of the bulk heater has two significant issues that cause errors in measuring temperature, 1) the resistance change is an estimate of the average temperature for the bulk heater from the cold bottom side of the heater line to the hot surface side, it is not measurement the actual surface temperature, and 2) the resistance change is not an accurate measure of true temperature. The change in resistance with temperature is only a small fraction of the total resistance of the heating device leading to significant errors in the temperature estimation.

This design has well defined geometries with a heat sink side of the device and an air path side of the device. The microheating portion of the device will reach nearly the same temperature each time it is operated for a given input power. Other microheaters have been produced on free, cantilevered structures which do not have a defined heat load and which can bend and move during the heating process.

This design is made specifically as a base for microscopy use. It is designed on a solid silicon chip base so it can be stable in x, y and z to nm dimensions even when heating to high temperatures.

The embodiments described herein are exemplary. Modifications, rearrangements, substitute devices, processes etc. may be made to these embodiments and still be encompassed within the teachings set forth herein.

The invention claimed is:

1. A calibration device comprising:
a planar thermal sensing device, and,
a planar micro heater comprising a microheating portion, wherein,
the micro heater and the thermal sensing device are integrated together, the microheating portion and the thermal sensing device having at least one planar surface in common, and wherein the thermal sensing device is placed directly above and in in overlapping direct planar contact with the microheating portion such that no additional electrical or thermal insulator is located between the at least one planar surface in common of the microheating portion and the thermal sensing device, and wherein,
the overall surface area dimensions of the micro heater is in the size range of 0.01 microns$^2$-0.25 mm$^2$.

2. The calibration device of claim 1 wherein the device is processed from a single crystal silicon wafer.

3. The calibration device of claim 1 wherein the thermal sensing device may include at least one of a thermocouple or thermistor.

4. The calibration device of claim 1 wherein the heater is defined using an ion implantation process.

5. The calibration device of claim 4 wherein the ion implantation is a low dose phosphorus ion implantation, and the dose and energy of the ion beam determines the resistance of the heater.

6. The calibration device of claim 1 wherein the heater is defined using at least one of thin film resistors of metals or metal compounds.

7. The calibration device of claim 1 wherein the heater contacts are defined with at least one of higher dose of phosphorous ion implantation or metal films.

8. The calibration device of claim 1 wherein the heater contacts are further connected with metal films to supply power to the heater.

* * * * *